(12) United States Patent
Watanabe et al.

(10) Patent No.: US 10,525,846 B2
(45) Date of Patent: Jan. 7, 2020

(54) VEHICLE ENERGY MANAGEMENT DEVICE

(71) Applicant: DENSO CORPORATION, Kariya, Aichi-pref. (JP)

(72) Inventors: Satoshi Watanabe, Kariya (JP); Akihiro Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/917,148

(22) PCT Filed: Sep. 2, 2014

(86) PCT No.: PCT/JP2014/004491
§ 371 (c)(1),
(2) Date: Mar. 7, 2016

(87) PCT Pub. No.: WO2015/037209
PCT Pub. Date: Mar. 19, 2015

(65) Prior Publication Data
US 2016/0207414 A1    Jul. 21, 2016

(30) Foreign Application Priority Data
Sep. 11, 2013 (JP) ................................. 2013-188384

(51) Int. Cl.
*B60L 58/10* (2019.01)
*B60L 1/00* (2006.01)
(Continued)

(52) U.S. Cl.
CPC .......... *B60L 58/10* (2019.02); *B60H 1/00642* (2013.01); *B60L 1/00* (2013.01); *B60L 3/12* (2013.01); *B60L 15/20* (2013.01)

(58) Field of Classification Search
None
See application file for complete search history.

(56) References Cited

U.S. PATENT DOCUMENTS 5,539,399 A    7/1996 Takahira et al.
2009/0012664 A1*    1/2009 Christ ................... B60L 1/003
701/22
(Continued)

FOREIGN PATENT DOCUMENTS

DE    102011112382 A1    3/2013
JP    H0731008 A    1/1995
(Continued)

OTHER PUBLICATIONS

International Search Report and Written Opinion (in Japanese with English Translation) for PCT/JP2014/004491, dated Nov. 4, 2014; ISA/JP.

*Primary Examiner* — Lail A Kleinman
(74) *Attorney, Agent, or Firm* — Harness, Dickey & Pierce, P.L.C.

(57) ABSTRACT

A vehicle energy management device includes: a storage device that stores a table indicating a control level with respect to a control content of a control target device executed by each electronic control device; an information acquisition device that acquires information related to a remaining amount of energy and a travel environment of the vehicle; a level setting device that sets a target value for suppressing a power consumption of a whole of the vehicle based on remaining amount information of the energy, refers to the table according to the target value and travel environment information, and sets the control level for each control target device to reach the target value for the whole of the vehicle; and a control unit that controls each electronic control device to execute a control for a respective control target device according to the control content indicated by the control level.

14 Claims, 5 Drawing Sheets

(51) Int. Cl.
*B60H 1/00* (2006.01)
*B60L 3/12* (2006.01)
*B60L 15/20* (2006.01)

(56) References Cited

U.S. PATENT DOCUMENTS

| | | | | |
|---|---|---|---|---|
| 2012/0316714 | A1* | 12/2012 | Nagayanagi | B60L 7/18 701/22 |
| 2013/0282265 | A1* | 10/2013 | Arita | G06F 17/00 701/123 |
| 2014/0295307 | A1* | 10/2014 | Toida | B60L 1/003 429/432 |

FOREIGN PATENT DOCUMENTS

| | | | |
|---|---|---|---|
| JP | 3177806 | B2 | 6/2001 |
| JP | 2003259549 | A | 9/2003 |
| JP | 3476953 | B2 | 12/2003 |
| JP | 2010254069 | A | 11/2010 |
| JP | 2011207384 | A | 10/2011 |
| JP | 2012137400 | A | 7/2012 |
| JP | 2012139026 | A | 7/2012 |
| JP | 2013018361 | A | 1/2013 |

* cited by examiner

FIG. 2

| | DISPLAY DEVICE | NAVIGATION AND AUDIO | REAR-END COLLISION PREVENTION |
|---|---|---|---|
| LEVEL 1 | CLEAR TFT IN METER; AND AGGREGATE VEHICLE PERIPHERAL INFORMATION IN HUD | STOP UNUSED FUNCTION | SHORTEN DETECTABLE DISTANCE (SUPPRESS OUTPUT OF RADAR) |
| LEVEL 2 | FURTHER, CLEAR CENTER DISPLAY; AND DISPLAY ONLY TURN BY TURN INFORMATION ON HUD | FURTHER, DROP OPERATING FREQUENCY OF MAIN COMPONENT; AND DECREASE MOVING FUNCTIONAL SITES | FURTHER, SUPPRESS OUTPUT OF RADAR; AND FUNCTION ONLY CONGESTION ASSIST |
| LEVEL 3 | FURTHER, COMPLETELY CLEAR METER; AND DISPLAY MINIMUM INFORMATION ON ONLY HUD | FURTHER, DECREASE SOUND VOLUME; AND STOP SOUND RECOGNITION | FURTHER, SUPPRESS OUTPUT OF RADAR; LENGTHEN TRANSMISSION CYCLE OF RADAR; AND DROP OPERATING SPEED OF MICROCOMPUTER |
| LEVEL 4 | — | FURTHER, COMPLETELY STOP AUDIO FUNCTION; AND STOP NAVIGATION FUNCTION OTHER THAN DISTANCE CALCULATION | FURTHER, OPERATE RADAR ONLY AT LOW SPEED |

| SITUATION | 1 | 2 | 3 |
|---|---|---|---|
| REQUIRED POWER SAVING DEGREE | −20% | −50% | −80% |
| TEMPERATURE | HOT | HOT | NORMAL |
| TRAVEL LOCATION | HIGHWAY | GENERAL ROAD | AROUND TOWN |
| DISPLAY DEVICE | LEVEL 3 | LEVEL 1 | LEVEL 3 |
| NAVIGATION | LEVEL 2 | LEVEL 3 | LEVEL 3 |
| REAR-END COLLISION PREVENTION | LEVEL 0 | LEVEL 1 | LEVEL 2 |
| AIR CONDITIONER | LEVEL 1 | LEVEL 2 | LEVEL 3 |
| MOTOR CONTROL | LEVEL 0 | LEVEL 1 | LEVEL 2 |

VEHICLE ENERGY MANAGEMENT DEVICE

CROSS REFERENCE TO RELATED APPLICATIONS

This application is a U.S. National Phase Application under 35 U.S.C. 371 of International Application No. PCT/JP2014/004491 filed on Sep. 2, 2014 and published in Japanese as WO 2015/037209 A1 on Mar. 19, 2015. This application is based on and claims the benefit of priority from Japanese Patent Application No. 2013-188384 filed on Sep. 11, 2013. The entire disclosures of all of the above applications are incorporated herein by reference.

TECHNICAL FIELD

The present disclosure relates to a vehicle energy management device that manages an energy required for travel of a vehicle.

BACKGROUND ART

Up to now, as an operation control for reducing an energy consumption of a vehicle air conditioner, an air conditioner control device that puts a function of a vehicle air conditioner into a stop state (predetermined low consumption state) if a predetermined condition is satisfied when the remaining charge amount (remaining amount) of a battery is equal to or smaller than a specific amount (small remaining amount) has been known (for example, refer to Patent Literature 1).

Specifically, in the air conditioner control device disclosed in Patent Literature 1, in order to attempt power saving while maintaining the comfort of an occupant as much as possible, current state information on temperatures inside and outside the vehicle, humidity, sunshine, and precipitation are acquired from various sensors, and an allowable time is calculated. The allowable time enables a comfortable air condition in a vehicle interior to be kept while the low consumption state is maintained with a changeover of the operation state of the vehicle air conditioner from a normal state to a low consumption state. The operation state of the vehicle air conditioner is switched from the normal state to the low consumption state on the condition that a predicted travel time to a destination of the vehicle becomes equal to or shorter than the allowable time. As a result, the occupant of the vehicle is expected to spend under a comfortable air condition in the vehicle interior until the vehicle reaches the destination.

Patent Literature 1 suggests that when it is determined on the basis of the above current state information that a period during which the comfortable air condition in the vehicle interior is kept can be more lengthened by positively incorporating an outside air into the vehicle interior, power windows may be controlled to open windows or a roof in conjunction with switching of the vehicle air conditioner to the low consumption state. Patent Literature 1 also suggests that vehicle electric equipments related to comfort, habitability, or convenience such as an automotive audio-visual equipment, interior lights, or power seats may be switched to the stop state, or only one channel of a GPS receiver may be used, and the other functions may be put into the stop state.

However, the conventional art disclosed in Patent Literature 1 is focused on keeping the comfortable air condition in the vehicle interior. Therefore, since the other vehicle-mounted devices are put into a predetermined low consumption state on the basis of the power saving control of the vehicle air conditioner, when the operation state of the vehicle air conditioner switches from the normal state to the low consumption state, there is a possibility that the comfort, the habitability, and the convenience other than the air condition are impaired at once.

As a result, because a state where the occupant of the vehicle enjoys all of the comfort, the habitability and the convenience is changed to a state where the occupant cannot enjoy the comfort, the habitability and the convenience other than the air condition, it is conceivable that the occupant feels uncomfortable about a gap between those states, or feels unpleasant.

PRIOR ART LITERATURES

Patent Literature

Patent Literature 1: JP-2013-18361 A

SUMMARY OF INVENTION

It is an object of the present disclosure to provide a vehicle energy management device that manages an energy required for travel of a vehicle for achieving an energy saving without allowing an occupant to feel uncomfortable or unpleasant as much as possible while performing a more intelligent energy management.

According to an aspect of the present disclosure, a vehicle energy management device that is connected to a plurality of electronic control devices mounted in a vehicle, and manages a energy required for driving the vehicle, includes: a storage device that stores a table indicative of a control level, which is leveled based on a power consumption, with respect to a control content of a control target device that is executed by each of the electronic control devices in order to realize a control target function, a vehicular device to be controlled by each of the electronic control devices being defined as the control target device, and a function provided by at least one of each of the electronic control devices and each of the control target devices being defined as the control target function; an information acquisition device that acquires information related to a remaining amount of the energy, and a travel environment of the vehicle; a level setting device that sets a target value for suppressing a power consumption of a whole of the vehicle based on at least remaining amount information indicative of the remaining amount of the energy in the information acquired by the information acquisition device, refers to the table stored in the storage device according to the target value and environmental information indicative of the travel environment in the information acquired by the information acquisition device, and sets the control level for each of the control target devices according to the travel environment in order to reach the target value for the whole of the vehicle; and a control unit that controls each of the electronic control devices to execute a control for a respective control target device according to the control content indicated by the control level individually set by the level setting device.

According to the above vehicle energy management device, in an energy management required for travel of the vehicle, an intelligent energy management taking into consideration not only comfort related to an air condition in a vehicle interior as in the conventional art, but also the other comfort, habitability, and convenience in total is performed.

As a result, energy saving can be achieved without allowing an occupant to feel uncomfortable or unpleasant as much as possible.

BRIEF DESCRIPTION OF DRAWINGS

The above and other objects, features and advantages of the present disclosure will become more apparent from the following detailed description made with reference to the accompanying drawings. In the drawings:

FIG. 2 is an illustrative view illustrating a content of a management table 22 used for setting of control levels;

FIG. 4 is an illustrative view illustrating a method of setting a control level corresponding to a situation of a vehicle.

EMBODIMENTS FOR CARRYING OUT INVENTION

Hereinafter, an embodiment of the present disclosure will be described with reference to the drawings.

(Overall Configuration)

Figure 1:
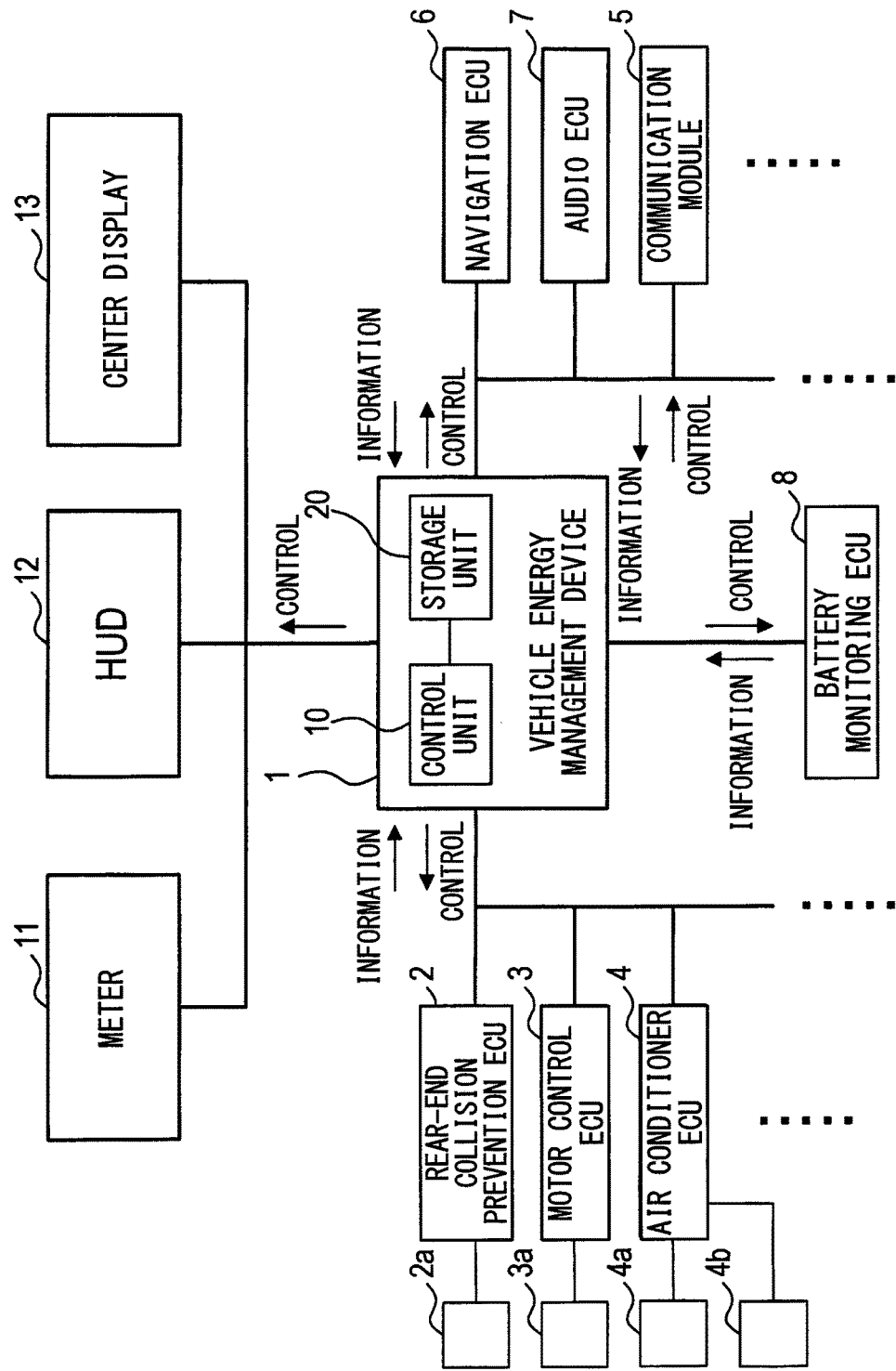
FIG. 1 is a block diagram illustrating an overall configuration of a vehicle system including a vehicle energy management device 1.

As illustrated in FIG. 1, a vehicle energy management device 1 according to this embodiment is one of ECUs that are multiple electronic control devices (electronic control units) mounted in a vehicle (electronic vehicle in this embodiment), and is connected to the other ECUs (a rear-end collision prevention ECU 2, a motor control ECU 3, an air conditioner ECU 4, a communication module 5, a navigation ECU 6, an audio ECU 7, a battery monitoring ECU 8, etc.) mounted in the vehicle, and display devices (a meter 11, a head-up display (HUD) 12, a center display 13).

Among those components, the vehicle energy management device 1 and the ECUs 2 to 8 are connected to, for example, a vehicle LAN (local area network), and transmit and receive various information to be shared with the respective components and control commands to the other ECUs through the vehicle LAN according to a predetermined protocol. When the vehicle energy management device 1 and the ECUs 2 to 8 receive the control commands, the vehicle energy management device 1 and the ECUs 2 to 8 control the vehicle-mounted device connected to the respective components according to control contents based on the control commands.

Hereinafter, the vehicle-mounted devices to be controlled by the respective ECUs 1 to 8 are called "control target equipments", and functions of the control target equipment and the ECUs 1 to 8 are called "control target functions". In other words, in order to realize the control target functions allocated to the respective control target equipments, the respective ECUs 1 to 8 control the respectively allocated control target equipments on the basis of the various information and the control commands obtained from the various sensors and the other ECUs.

Specifically, each of the ECUs 1 to 8 mainly includes a known information processing device (for example, a microcomputer) having a CPU, a ROM, a RAM, and an I/O, and a storage device (for example, a nonvolatile memory). The CPU executes various control processes with the use of the RAM as an operation area on the basis of programs stored in the ROM or the storage device. In execution of the control processes, each of the ECUs 1 to 8 can variously set a control cycle of each control process and an operating frequency of the CPU.

The rear-end collision prevention ECU 2 is connected to a radar device 2a as the control target equipment. The radar device 2a is installed, for example, in a front end of the vehicle, transmits a radar wave (for example, a laser wave, a millimeter wave, an ultrasonic wave and the like) to the front of the vehicle, and receives a radar wave (reflected wave) arriving from a target object that reflects the radar wave in the front of the vehicle. The radar device 2a measures a distance between the vehicle and the target object, and a relative velocity on the basis of a transmission timing of the radar wave and a reception timing of the reflected wave. The rear-end collision prevention ECU 2 determines a collision possibility with an obstacle in front of the vehicle with the use of measurement results of the radar device 2a, and performs a vehicle control higher in intervention in order of a warning to a driver and the operation of automatic brake as the collision possibility becomes higher to prevent the collision with the obstacle. The rear-end collision prevention ECU 2 controls a transmission output and a transmission cycle of the radar wave by the radar device 2a.

The motor control ECU 3 controls a motor 3a as a power source of the vehicle (electronic vehicle in this embodiment) as the control target equipment, and performs a motor control for accelerating and decelerating the vehicle at a rate corresponding to the amount of depression of an accelerator pedal. In performing a control for the motor 3a, the motor control ECU 3 variably sets the rate of the acceleration and deceleration for the amount of depression of the accelerator pedal, and a maximum output of the motor 3a.

The air conditioner ECU 4 controls a vehicle air conditioner 4a as the control target equipment, and performs an air conditioner control for adjusting a compression strength of a refrigerant (air conditioner gas) by a compressor and a blowing strength so as to keep a temperature in the vehicle interior at a temperature set by the user. In performing the air conditioner control, the air conditioner ECU 4 transmits control commands for automatically opening or closing windows or a roof to the vehicle LAN as occasion demands in cooperation with an ECU (not shown) for controlling power windows (including the roof). The air conditioner ECU 4 is connected to various sensors 4b such as temperature sensors inside or outside the vehicle, a humidity sensor, and a sunshine sensor, and transmits sensor information indicative of detection results of those sensors to the vehicle LAN.

The battery monitoring ECU 8 measures the current remaining charge amount (remaining amount of energy) in a vehicle storage battery (battery), and transmits information indicative of the measurement results to the vehicle LAN.

The navigation ECU 6 is an ECU comprehensively controlled by the vehicle energy management device 1. The navigation ECU 6 detects a position of the vehicle on the basis of a positioning signal from a positioning satellite used for a GPS, or a detection signal from a distance sensor or a gyroscope. The navigation ECU 6 also calculates a route to a destination designated by the user on the basis of map data stored in a map storage medium, and performs a known navigation process for performing a routing assistance. The navigation ECU 6 transmits navigation information indicative of a target travel distance (a distance from a current position of the vehicle to a destination) set by the route calculation, the type of a road (travel road) on which the vehicle is traveling or is to travel, a difference in height of the road, the abundance of traffic lights, or an expected average speed (=target travel distance/expected arrival time) of the vehicle to the vehicle LAN.

The communication module 5 and the audio ECU 7 are ECUs comprehensively controlled by the vehicle energy management device 1. The audio ECU 7 controls a vehicle acoustic equipment as the control target equipment. Upon receiving control commands for adjusting a sound volume or stopping an audio function from the vehicle LAN, the audio ECU 7 controls the vehicle acoustic equipment according to the control command. The communication module 5 is configured to perform a wireless communication with a vehicle exterior, and transmits congestion information related to the travel road (including a planned travel route) and external information such as a road condition, weather, temperature, or humidity to the vehicle LAN.

The vehicle energy management device 1 acquires information (hereinafter referred to as "remaining amount information") indicative of the remaining amount of battery from the battery monitoring ECU 8 through the vehicle LAN. The vehicle energy management device 1 also acquires information (hereinafter referred to as "environmental information") indicative of a travel environment of the vehicle from the other ECUs 2 to 7 through the vehicle LAN. Specifically, as the environmental information, the vehicle energy management device 1 acquires navigation information from the navigation ECU 6, acquires the external information from the communication module 5, and acquires the sensor information from the air conditioner ECU 4.

The vehicle energy management device 1 includes a control unit 10 mainly including a microcomputer, and a storage unit 20 in which the various programs are stored. The control unit 10 performs a process (energy management process) for managing an energy required for travel of the vehicle on the basis of the information acquired from the other ECUs 2 to 8 according to the programs stored in the storage unit 20. The control unit 10 also performs a process (display control process) for controlling the display devices (meter 11, HUD 12, center display 13).

Among those processes, the display control process allows the information input from the respective ECUs 2 to 8 or the various sensors to be displayed on the display device (meter 11, HUD 12, center display 13) corresponding to the type of the information. For example, the display control process allows the vehicle information such as a vehicle speed, a motor rotation speed, the remaining amount of the battery, a mileage, the operation position of a direction indicator and a shift lever, or a state of various gauges to be displayed in a main region of the meter 11. The display control process allows vehicle peripheral information that is various information (information related to an obstacle in front of the vehicle) obtained from the rear-end collision prevention ECU 2 to be displayed in a sub-region of the meter 11. The display control process also allows the navigation information (for example, information on the routing assistance or the current position of the vehicle, or the travel road) obtained from the navigation ECU 6 to be displayed on the center display 13, and allows various information corresponding to, for example, user setting to be displayed on the HUD 12.

The vehicle energy management device 1 includes an input interface that receives various input operations by the user. Upon receiving various user settings or an input of the destination by a mechanical switch or a software switch (switch on a touch panel), the vehicle energy management device 1 transmits the input information to a corresponding ECU through the vehicle LAN as occasion demands.

The storage unit 20 includes a nonvolatile memory, and stores the above programs as well as a management table 22 referred to in implementing an energy management process (and display control process) on the basis of the above programs by the control unit 10.

<Management Table>

The management table 22 shows control levels, which are leveled on the basis of the respective power consumptions, of control contents executed on the respective control target equipments connected to the vehicle energy management device 1 and the respective ECUs 2 to 8. In this embodiment, it is defined that an electric power consumed by the ECU and the control target equipment with the control content is larger as the control level is lower, and the electric power consumed by the ECU and the control target equipment with the control content is smaller as the control level is higher. In other words, a power saving effect becomes higher as the control level is higher.

For example, as illustrated in FIG. 2, when a control level is level 1, it is defined that the control content of the display device which is the control target equipment of the vehicle energy management device 1 clears a TFT (thin film transistor) in the sub-region of the meter 11, and allows information to be displayed in the thus turned off sub-region in the meter 11 (vehicle peripheral information in this embodiment) to be displayed on the HUD 12, instead. In this embodiment, it is assumed that the power consumption when the information is displayed on the HUD 12 is smaller than that when the same information is displayed in the sub-region in the meter 11.

When the control level is level 2, it is defined that the control content further clears the center display 13 in order to enhance the power saving effect more than that in the level 1, and allows turn-by-turn information (information indicative of a vehicle guidance direction at the time of right and left turns in the routing assistance) of the information (navigation information in this embodiment) to be displayed on the center display 13 thus turned off to be displayed on the HUD 12, instead.

When the control level is level 3, it is defined that the control content further clears a TFT (thin film transistor) in a main region of the meter 11 in order to enhance the power saving effect more than that in the level 2, and allows only minimum information such as the vehicle speed or the remaining amount of the battery of the information (vehicle information in this embodiment) to be displayed in the main region thus turned off in the meter 11 to be displayed on the HUD 12, instead.

As described above, the control level related to the vehicle energy management device 1 (display control process) is defined to increase or decrease the power consumption of the overall display device in a stepwise manner, and the display device (meter 11 or center display 13 in this embodiment) relatively large in the power consumption, which reduces the information to be displayed more as the control level becomes larger, turns off, and the information is aggregated in the display device (HUD 12 in this embodiment) relatively small in the power consumption.

On the other hand, when the control level is 1, it is defined that the control content such as the vehicle acoustic equipment or a video equipment which is the control target equipment of the navigation ECU 6 and the audio ECU 7 switches a function not used such as a wireless LAN (WiFi) function or a video encoding function from an active state to a stop state (that is, stops the function not used). When the control level is level 2, it is defined that the control content further drops the operating frequency of main components (ECU and image processing circuit) in order to enhance the power saving effect more than that in the level 1, and decreases the number of operating functional sites, for example, stops a drive recorder.

When the control level is level 3, it is defined that the control content reduces an audio output (sound volume) more than the original in order to enhance the power saving effect more than that in the level 2, or stops a sound recognition function. When the control level is level 4, it is defined that the control content stops all of the audio functions, and also stops the navigation function other than the calculation of the target travel distance.

As described above, the control level related to the navigation ECU 6 and the audio ECU 7 is defined to increase or decrease the power consumption of the ECU and the overall peripheral equipments in a stepwise manner, and the control content reduces the available functions more, drops the operating frequency more, or decreases the output more as the control level becomes higher.

When the control level is 1, it is defined that the control content of the radar device 2a, which is the control target equipment of the rear-end collision prevention ECU 2, suppresses the output of the radar device 2a to shorten the detectable distance related to a target object in front of the vehicle. When the control level is level 2, it is defined that the control content further suppresses the output of the radar device 2a in order to enhance the power saving effect more than that in the level 1, and also stops the functions of, for example, a cruise control other than a congestion assist (performs a travel control while following the forward vehicle at the time of congestion.

When the control level is level 3, it is defined that the control content further suppresses the output of the radar device 2a in order to enhance the power saving effect more than that in the level 2, and also lengthens the transmission cycle of the radar wave in the radar device 2a, and drops the operating speed of the ECU to stop the collision prevention function with the obstacle (collision damage suppression function is continued). When the control level is level 4, it is defined that the control content further operates the radar device 2a only during a low-speed travel of the vehicle in order to enhance the power saving effect more than that in the level 3.

As described above, the control level related to the rear-end collision prevention ECU 2 is defined to increase or decrease the power consumption of the ECU and the overall radar device 2a in a stepwise manner, and the control content reduces the transmission output or the transmission cycle of the radar wave in the radar device 2a more, decreases the operating speed (operating frequency) of the ECU and the microcomputer more, reduces the available functions more as the control level becomes higher, or stops the operation of the radar device 2a under a predetermined condition.

Although not shown, the control level related to the air conditioner ECU 4 limits upper and lower ranges of the set temperature, effects only blowing while turning off the compressor, or turns off the air conditioner and opens the windows or the roof as the control content becomes higher.

It is defined that the control level related to the motor control ECU 3 decreases a rotation output to an accelerator depression amount (for example, peak cut) to prevent rapid acceleration, or further decreases a maximum output of the motor 3a to suppress the vehicle speed for power saving, as the control level becomes higher.

In other words, in the management table 22, the control content leveled for each of the power saving effects is defined in each of the vehicle energy management device 1 and each of the ECUs 2 to 7. The respective control levels defined as described above are associated with contributions for suppressing the power consumption of the overall vehicle, and a total of those contributions corresponds to a required power saving degree to be described later as a target value.

Each of the ECUs 2 to 7 stores a correspondence relationship between the control level related to the subject device and the control content. Upon receiving a notification (control command) of the control level from the vehicle energy management device 1 through the vehicle LAN, each of the ECUs 2 to 7 controls the control target equipment according to the control content indicated by the control command. Upon receiving an acknowledgment request of the control level from the vehicle energy management device 1 through the vehicle LAN, each of the ECUs 2 to 7 transmits the information indicative of the control level defining the control content during execution to the vehicle energy management device 1 through the vehicle LAN.

<Energy Management Process>

Figure 3:
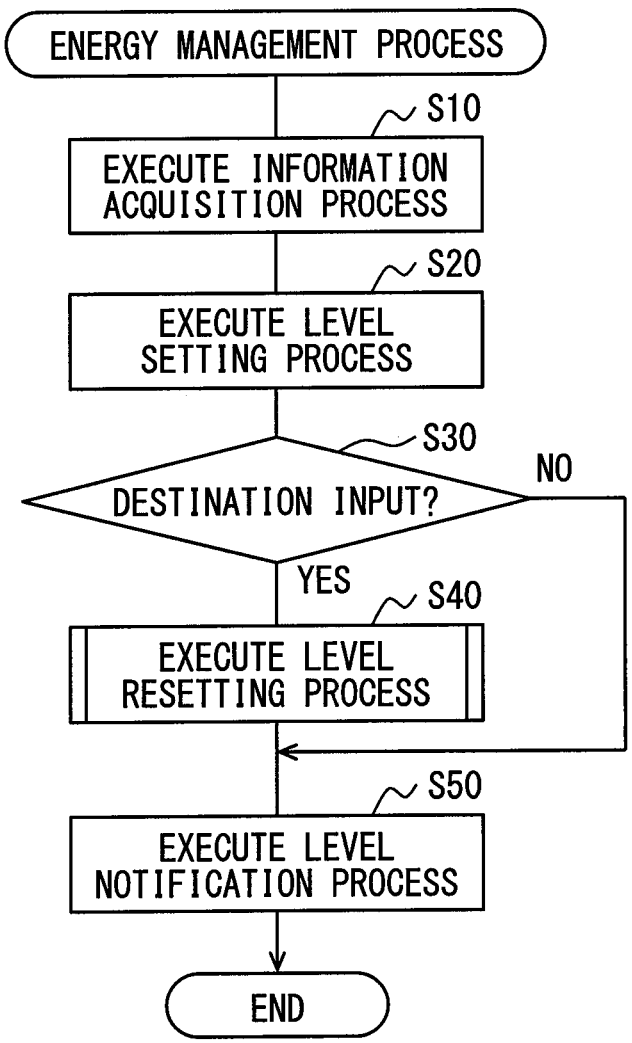
FIG. 3 is a flowchart illustrating a content of an energy management process to be executed by a control unit 10 of the vehicle energy management device 1.

Subsequently, the energy management process to be executed by the control unit 10 of the vehicle energy management device 1 will be described with reference to a flowchart of FIG. 3. This process starts upon turning on an ignition switch of the vehicle. This is not always applied when the energy management function is turned off by user setting.

When this process starts, the control unit 10 starts a process (hereinafter referred to as "information acquisition process") for acquiring information required for this processing from the other ECUs 2 to 8 through the vehicle LAN in S10. As already described, specifically, the information acquisition process acquires the remaining amount information from the battery monitoring ECU 8, acquires the navigation information from the navigation ECU 6, acquires the external information from the communication module 5, and acquires the sensor information from the air conditioner ECU 4. The navigation information, the external information, and the sensor information correspond to information (environmental information) related to the travel environment of the vehicle.

Then, in S20, the control unit 10 sets the required power saving degree as the target value for suppressing the power consumption of the overall vehicle on the basis of at least the remaining amount of energy indicated by the remaining amount information of the information acquired in S10. In setting the required power saving degree, for the purpose of improving the precision, the control unit 10 may periodically (for example, for each one hour) collect an average power consumption of each ECUs 1 to 7 as occasion demands, store the collected average power consumption as basic data for controlling the respective ECUs 1 to 7, convert the data according to the control level, and calculate the required power saving degree. Further, the control unit 10 starts a process (hereinafter referred to as "level setting process") for setting the individual control level for each of the control target equipments depending on the travel environment so that the required power saving degree is obtained in the overall vehicle, with reference to the management table 22 stored in the storage unit 20 on the basis of the required power saving degree and the travel environment indicated by the environmental information.

Specifically, in the level setting process, the control unit 10 variably sets the control level in the management table 22 for each of the ECUs 1 to 7. As a result, the control unit 10 selects the control levels related to the individual ECUs 1 to 7 so that comfort, habitability, and convenience of the vehicle occupant are not impaired as much as possible, in a state where a total of the contributions to the power savings obtained, individually, falls within a range equal to or larger than the required power saving degree, taking the travel environment of the vehicle into consideration.

For example, as illustrated in FIG. 4, a situation (1) is assumed in which when the required power saving degree is set to a target value lower than a predetermined reference value by −20%, an outside temperature is high (hot), and the vehicle travels on a highway. In this example, the control level related to the display device (display control process of the vehicle energy management device 1) is set to the level 3, the control level related to the navigation ECU 6 (including the audio ECU 7) is set to the level 2, the control level related to the air conditioner ECU 4 is set to the level 1, and the control level related to the other ECUs 2 and 3 is set to the level 0. In the drawing, a level 0 of the control level indicates the normal control content (control content larger in the power consumption than that in the level 1).

In other words, in the situation (1), when the vehicle travels on the highway, since the vehicle driver does not relatively require the display device, the control unit 10 completely clears the meter 11 (and the center display 13) in the display device, and sets the control level related to the display device to the control content (level 3) for displaying the minimum information on only the HUD 12. On the other hand, the rear-end collision prevention ECU 2 is set to the normal control content (level 0) since the target object located at a long distance from the front of the vehicle must be also detected by the radar device 2*a*. The navigation ECU 6 is set to the control content (level 2) without any limit of the sound volume since the vehicle occupant cannot hear sound due to an influence of road noise if the sound volume is set to be small. The air conditioner ECU 4 is set to the control content (level 1) relatively small in functional limitation since the window is difficult to open when the vehicle is on the highway. The motor control ECU 3 is set to the normal control content (level 0) because the vehicle travels on the highway.

For example, as illustrated in FIG. 4, a situation (2) is assumed in which when the required power saving degree is set to a target value lower than a predetermined reference value by −50%, an outside temperature is high (hot), and the vehicle travels on a general road. In this example, the control level related to the display device (display control process of the vehicle energy management device 1) is set to the level 1, the control level related to the navigation ECU 6 (including the audio ECU 7) is set to the level 3, the control level related to the air conditioner ECU 4 is set to the level 2, and the control level related to the other ECUs 2 and 3 is set to the level 1.

In other words, in the situation (2), when the vehicle travels on the general road, since the vehicle driver relatively requires the display device, and particularly requires the detailed navigation information, the control unit 10 sets the control level related to the display device to the control content (level 1) for enabling the display of the center display 13. On the other hand, the rear-end collision prevention ECU 2 is set to the control content (level 3) relatively large in an output reduction degree of the radar device 2*a* since the target object located at a long distance from the front of the vehicle may not be detected by the radar device 2*a*. The navigation ECU 6 is set to the control content (level 3) with the limit of the sound volume because difficulty little occurs even if the sound volume is reduced. The air conditioner ECU 4 is set to the control content (level 2) relatively large in functional limitation because the required power saving degree is relatively high, and the windows can be opened when the vehicle is on the general road although comfort is low. The motor control ECU 3 is set to the control content (level 1) for cutting a rapid acceleration of the vehicle for the purpose of improving an electricity consumption.

For example, as illustrated in FIG. 4, a situation (3) is assumed in which when the required power saving degree is set to a target value lower than a predetermined reference value by −80%, an outside temperature is a suitable temperature (normal), and the vehicle travels around a town. In this example, the control level related to the display device (display control process of the vehicle energy management device 1) is set to the level 3, the control level related to the navigation ECU 6 (including the audio ECU 7) is set to the level 3, the control level related to the air conditioner ECU 4 is set to the level 3, and the control level related to the other ECUs 2 and 3 is set to the level 2.

In other words, in the situation (3), since the required power saving degree is very high, the control unit 10 completely clears the meter 11 (and the center display 13) in the display device, and sets the control level related to the display device to the control content (level 3) for displaying the minimum information on only the HUD 12. On the other hand, the rear-end collision prevention ECU 2 is set to the control content (level 2) in which the collision prevention function can be continued since a possibility that the number of obstacles is relatively large is high because the vehicle travels around the town. The navigation ECU 6 and the air conditioner ECU 4 are set to the control content (level 3) large in the functional limitation with the expense of comfort. The motor control ECU 3 is set to the control content (level 2) relatively large in the functional limitation.

As described above, in the level setting process, the control level is not mechanically set according to the required power saving degree, but the control level related to the individual ECUs 1 to 7 is set intelligently according to the situation including the travel environment of the vehicle so that the comfort, habitability, and convenience of the vehicle occupant are not impaired as much as possible.

Returning to FIG. 3, in S30 subsequent to S20, it is determined whether a destination is input by the user setting, or not. If the destination is input, it is determined in S40 whether a change in the control level is necessary, or not, with the use of the above-mentioned target travel distance, and the control unit 10 starts a control level resetting process for resetting the control level as occasion demands. On the other hand, when the destination is not set, since the navigation ECU 6 cannot calculate the target travel distance, the control unit 10 skips S40, and proceeds to S50 for the purpose of setting the individual control level for each of the control target equipments depending on the travel environment so that the required power saving degree is obtained in the overall vehicle, with reference to the management table 22 on the basis of the required power saving degree and the travel environment of the vehicle as already described.

In S50, the control unit 10 starts a process (hereinafter referred to as "level notification process") for notifying the corresponding ECUs 2 to 7 of the control levels (control commands) for the individual ECUs 2 to 7 set in S20 or S40 through the individual LAN. Each of the ECUs 2 to 7 that has received the above notification controls the corresponding control target equipment with the control content indicated by the control level according to the control command from the vehicle energy management device 1.

<Level Resetting Process>

Figure 5:
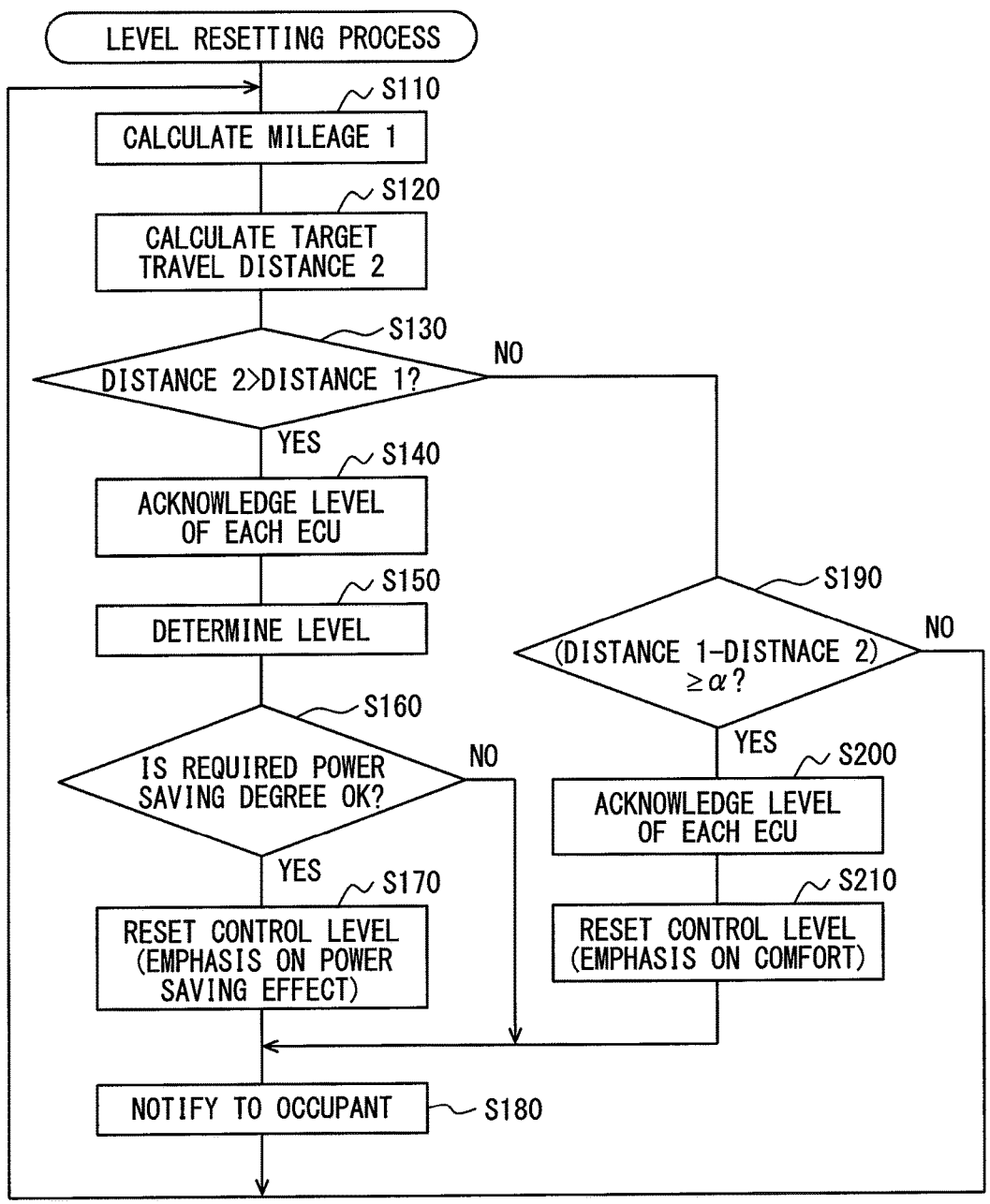
FIG. 5 is a flowchart illustrating a content of a level setting process to be executed in an energy management process by the control unit 10.

Then, a description will be given of the detail of the level resetting process to be executed in S40 of the above energy management process with reference to a flowchart of FIG. 5.

When this process starts, the control unit 10 calculates a vehicle travelable distance (hereinafter referred to as "mileage") in S110 on the basis of the remaining amount of battery indicated by the remaining amount information acquired in S10. In subsequent S120, the control unit 10 corrects a target travel distance calculated by the navigation ECU 6 on the basis of the environmental information acquired in S10.

Specifically, the control unit 10 outputs a coefficient through a predetermined formula with information such as congestion information on a planned travel road, a difference in height of the road, the abundance of traffic lights, or an expected average speed of the vehicle, weather, or a road condition (paved road, unpaved road) as input parameters. The control unit 10 multiplies the coefficient by the target travel distance calculated by the navigation ECU 6, thereby being capable of correcting the target travel distance. The mileage calculated in S110 can be corrected in the same method.

Then in S130, the control unit 10 compares the mileage calculated (corrected) in S110 with the target travel distance calculated (corrected) in S120, and determines whether the target travel distance exceeds the mileage, or not. If the target travel distance exceeds the mileage, the control unit 10 proceeds to S140, and if the target travel distance is equal to or shorter than the mileage, the control unit 10 proceeds to S190.

In S140, the control unit 10 transmits an acknowledgment request of the control level to the vehicle LAN to receive the information indicative of the control levels that define the control contents during execution from the other ECUs 2 to 7, and temporally stores the current control levels in the respective ECUs 1 to 8 including the subject device in the RAM on the basis of the received information.

In subsequent S150, as already described, the control unit 10 sets the required power saving degree, and determines whether the required power saving degree is obtained in the overall vehicle, or not, with reference to the management table 22 stored in the storage unit 20 on the basis of the required power saving degree and the travel environment indicated by the environmental information. Specifically, when the control level in the management table 22 is variably set to an upper limit for each of the ECUs 1 to 7 within a range allowable on the basis of the situations of the vehicle, the control unit 10 determines whether a total of the contributions to the power saving obtained, individually, becomes equal to or higher than the required power saving degree, or not.

If the total of the contributions to the power saving in the ECUs 1 to 8 becomes equal to or higher than the required power saving degree in subsequent S160 according to the determination result in S150, the control unit 10 proceeds to S170, and if the total of the contributions to the power saving becomes lower than the required power saving degree, the control unit 10 proceeds to S180, and notifies the vehicle occupant of that fact. Specifically, in S180 subsequent to S160, since the total of the contributions to the power saving in the ECUs 1 to 8 is lower than the required power saving degree within the range allowed on the basis of the situation of the vehicle, the control unit 10 notifies the vehicle occupant of the fact that the comfort, habitability, and convenience of the vehicle occupant are impaired, and the fact that power feed is necessary, and returns to S110. In this case, the control unit 10 may display a feeding facility closest to the current position of the vehicle, a feeding facility closest on the planned travel route, or a feeding facility that is located within an area of the mileage on a screen of the display device (center display 13) in cooperation with the navigation ECU 6. For example, when the feeding facility is selected on the display screen by the user, the control unit 10 can newly calculate the target travel distance with the selected feeding facility as the destination.

In S170, as already described, for the purpose of enhancing the power saving effect, the control unit 10 resets the control levels related to the individual ECUs 1 to 7 so that comfort, habitability, and convenience of the vehicle occupant are not impaired as much as possible, in a state where the total of the contributions to the power savings in the ECUs 1 to 8 falls within a range equal to or larger than the required power saving degree, taking the travel environment of the vehicle into consideration. Specifically, the control unit 10 pulls up the control level related to at least one of the ECUs 1 to 7 from the control level temporarily stored in S140, proceeds to S180, notifies the vehicle occupant of the fact that the control level is pulled up, and returns to S110.

On the other hand, in S190 shifted when the target travel distance is equal to or shorter than the mileage in S130, the control unit 10 determines whether a difference value between the mileage and the target travel distance is equal to or larger than a predetermined margin value a, or not. If the difference value is equal to or larger than the margin value a, the control unit 10 proceeds to S200. If the difference value is smaller than the margin value a, the control unit 10 returns to S110. The margin value a is a value set in advance for suppressing a frequent change in the control level, and a case in which the difference value is smaller than the margin value a represents that the mileage is larger than the target travel distance, but a difference between the mileage and the target travel distance is slight. For that reason, the control unit 10 returns to S110 without performing a process for pulling down the control level in S200 and the subsequent steps. Conversely, a case in which the difference value is equal to or larger than the margin value a represents that the mileage is larger than the target travel distance with a margin.

Specifically, in S200, as in S140, the control unit 10 transmits an acknowledgment request of the control level to the vehicle LAN to receive the information indicative of the control levels that define the control contents during execution from the other ECUs 2 to 7, and temporally stores the current control levels in the respective ECUs 1 to 8 including the subject device in the RAM on the basis of the received information.

In subsequent S210, as already described, for the purpose of weakening the power saving effect, the control unit 10 resets the control levels related to the individual ECUs 1 to 7 so that comfort, habitability, and convenience of the vehicle occupant are not impaired as much as possible, in a state where the total of the contributions to the power savings in the ECUs 1 to 8 falls within a range equal to or larger than the required power saving degree, taking the travel environment of the vehicle into consideration. Specifically, the control unit 10 pulls down the control level related to at least one of the ECUs 1 to 7 from the control level temporarily stored in S200, proceeds to S180, notifies the vehicle occupant of the fact that the control level is pulled down, and returns to S110.

Advantages

As has described above, the vehicle energy management device 1 is connected to the multiple ECUs 2 to 8, and includes the control unit 10 that executes the energy management process (and display control process), and the storage unit 20 that stores the management table 22.

In the energy management process, the control unit 10 acquires the information on the remaining amount of energy and the travel environment of the vehicle by the information acquisition process. Then, the control unit 10 sets the target value (required power saving degree) for suppressing the power consumption of the overall vehicle on the basis of at least the remaining amount information indicative of the remaining amount of the energy, and sets the individual control levels for each of the ECUs 2 to 8 (further control target equipments) depending on the travel environment of the vehicle so that the required power saving degree is obtained in the overall vehicle with reference to the management table 22 by the level setting process.

Further, the control unit 10 notifies a corresponding one of the ECUs 2 to 8 of the control level set for each of the control target equipments, individually, by the level notification process, to thereby allow the control for the control target equipment to be implement by each of the ECUs 2 to 8 with each control content indicated by the control level.

In the above configuration, when there is a need to suppress the power consumption of the overall vehicle, the control level required for the power saving is set for each of the control target equipments according to the situation (travel environment and the remaining amount of energy) of the vehicle, individually, and each of the control target equipments is subjected to the control of the corresponding electronic control device by each control content indicated by the control level (information leveled on the basis of the power consumption) thus set, individually. For that reason, each of the multiple electronic control devices implements the control with the control level totally optimized from the viewpoint including the comfort, habitability, and convenience according to the situation of the vehicle, thereby being capable of performing the power saving control of the overall vehicle.

Therefore, according to the vehicle energy management device 1, in an energy management required for travel of the vehicle, an intelligent energy management taking into consideration not only comfort related to an air condition in a vehicle interior as in the conventional art, but also the other comfort, habitability, and convenience in total is performed. As a result, energy saving can be achieved without allowing an occupant to feel uncomfortable or unpleasant as much as possible.

In the vehicle energy management device 1, the control level may be changed on the basis of only the monitoring results related to the remaining amount of energy by the battery monitoring ECU 8. Alternatively, in order to perform the more intelligent energy management, the target travel distance to the destination of the vehicle set by the navigation ECU 6 is compared with the mileage of the vehicle to change the control level on the basis of the comparison result.

Specifically, in the level setting process, when the target travel distance is longer than the mileage, because the control unit 10 resets the control level for the purpose of enhancing the suppression degree of the power consumption of the overall vehicle, the control level can be more suitably switched according to the situation of the vehicle.

Specifically, in the level setting process, in the case where the target travel distance is equal to or shorter than the mileage, when the difference value between the mileage and the target travel distance is lower than a predetermine margin value, the control unit 10 maintains the control level, and when the difference value between the mileage and the target travel distance is equal to or larger than the predetermine margin value, because the control unit 10 resets the control level for the purpose of weakening the suppression degree of the power consumption of the overall vehicle, the power saving control more emphasizing the comfort, habitability, and convenience can be performed while the control level is restrained from being frequently changed.

The vehicle energy management device 1 is a display control device that controls the multiple display devices different in the power consumption from each other as the control target equipments, and the control level related to the display control device is defined to increase and decrease the power consumption of the overall display device in a stepwise manner.

With the above definition, the power saving control of the overall display device can be performed multifariously. Because at least one of the control levels related to the display control device turns off the display device relatively large in the power consumption, and allows information displayed on the display device that turns off to be displayed on the display device relatively small in the power consumption, the power saving control can be performed without impairing the convenience of the user as much as possible.

In the vehicle energy management device 1, the rear-end collision prevention ECU 2 is a radar control device that controls the radar device 2a as the control target equipment. At least one of the control levels related to the radar control device reduces at least one of the output of the radar device 2a and the transmission cycle of the radar wave. Therefore, the energy saving can be realized while the function in a range corresponding to the situation of the vehicle is ensured, as compared with a case in which the radar device 2a is put into the stop state.

Other Embodiments

The embodiments of the present disclosure have been described above. However, the present disclosure is not limited to the embodiments described above, and various modifications can be implemented without departing from the spirit of the present disclosure.

For example, in the energy management process (level setting process) of the above embodiment, the control level is variously set according to the situation of the vehicle including the travel environment. However, the environmental information indicative of the travel environment is not limited to that described in the above embodiment, but may include various information such as driver's age and sex, the number of occupants in the vehicle, and the configuration of the occupants (age, sex, etc.), which are input by the user setting.

With the use of the above information, for example, when an elderly or an infant gets in the vehicle, the required power saving degree is set to be smaller, as a result of which the energy management process more emphasizing the comfort, habitability, and convenience can be performed. In this way, the required power saving degree may be a value obtained by subtracting a magnitude corresponding to user's preference from the minimum value on the basis of the information set by the user in advance.

The required power saving degree or the mileage calculated in the energy management process (level setting process) of the above embodiment may be displayed on the display device. In this case, the required power saving degree and the mileage may be displayed with a greenish color if, for example, the mileage is large, and may be displayed with a yellowish or reddish color in order to alert the vehicle driver for as the mileage is shorter.

In the energy management process (level setting process) of the above embodiment, if the target travel distance is equal to or shorter than the mileage, the processing is branched according to the comparison result of the difference value between the mileage and the target travel distance with the margin value a. However, the present disclosure is not limited to this configuration, but the control level may be maintained uniformly if, for example, the target travel distance is equal to or shorter than the mileage, or the control level may be reset for the purpose of weakening the suppression degree of the power consumption of the overall vehicle.

The vehicle energy management device 1 according to the above embodiment controls the display device as the control target equipment. However, the present disclosure is not limited to this configuration, but another ECU connected to the vehicle energy management device 1 may be configured to perform the above display control process. The vehicle energy management device 1 may be configured within another ECU.

In the above embodiment, the vehicle in which the vehicle energy management device 1 is mounted is exemplified by the electronic vehicle. However, the present disclosure is not limited to this configuration, but the vehicle energy management device 1 may be mounted in a gasoline vehicle or a hybrid vehicle. For example, in the case of the gasoline vehicle, the remaining amount of gasoline may be monitored as the energy, and in the case of the hybrid vehicle, the remaining amounts of both the battery (charge amount) and gasoline may be monitored as the energy.

The above-mentioned disclosure includes the following embodiments.

According to an aspect of the present disclosure, a vehicle energy management device is connected to multiple electronic control devices mounted in a vehicle, and manages an energy required for travel of the vehicle. The vehicle energy management device includes: a storage device that stores a table indicative of control levels, which are leveled on the basis of a power consumption, of a control content which is executed on a control target equipment by each of the electronic control devices for realizing a control target function, with a vehicle-mounted device to be controlled by each of the electronic control devices as the control target equipment, and a function provided by at least one of each electronic control devices and each control target equipment as the control target function; an information acquisition device that acquires information related to the remaining amount of the energy, and a travel environment of the vehicle; a level setting device that sets a target value for suppressing a power consumption of the overall vehicle on the basis of at least remaining amount information indicative of the remaining amount of the energy in the information acquired by the information acquisition device, and sets the individual control level for each of the control target equipments according to the travel environment to obtain the target value for the overall vehicle with reference to the table stored in the storage device on the basis of the target value and environmental information indicative of the travel environment in the information acquired by the information acquisition device; and a control unit that allows each of the electronic control devices to implement a control for the control target equipment according to each control content indicated by the control level set by the level setting device, individually.

In the above configuration, when there is a need to suppress the power consumption of the overall vehicle, the control level required for the power saving is set for each of the control target equipments according to the situation (travel environment and the remaining amount of energy) of the vehicle, individually, and each of the control target equipments is subjected to the control of the corresponding electronic control device by each control content indicated by the control level (information leveled on the basis of the power consumption) thus set, individually.

According to the above configuration, each of the multiple electronic control devices implements the control with the control level totally optimized from the viewpoint including the comfort, habitability, and convenience according to the situation of the vehicle, thereby being capable of performing the power saving control of the overall vehicle.

Therefore, according to the present disclosure, in an energy management required for travel of the vehicle, an intelligent energy management taking into consideration not only comfort related to an air condition in a vehicle interior as in the conventional art, but also the other comfort, habitability, and convenience in total is performed. As a result, energy saving can be achieved without allowing an occupant to feel uncomfortable or unpleasant as much as possible.

In the present disclosure, the target value is an index required for power saving set on the basis of at least the remaining amount information indicative of the remaining amount of the energy, and the control level is information set according to the travel environment so that the target value is obtained in the overall vehicle. For that reason, the control level is information set according to not only the travel environment but also the remaining amount of energy as the situation of the vehicle.

In the present disclosure, the target value may be an index minimum for the power saving, or an index obtained by adding a magnitude corresponding to the user's preference to the minimum value on the basis of the information set in advance by the user.

The information (environmental information to be described later) related to the travel environment can include current state information such as temperatures inside and outside the vehicle, humidity, sunshine, weather such as precipitation, a driving time zone as well as predictable information such as various information (congestion information, road type, road conditions, a difference in the height of the road, the abundance of traffic lights, and an expected average speed) on the route calculated by the navigation device, information related to the vehicle such as the number of occupants or a weight of the vehicle (vehicle body+occupants+luggage), and information related to the driver or the occupants.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle energy management device connected to a plurality of electronic control units (ECUs) mounted in a vehicle, and manages an energy required for driving the vehicle, the vehicle energy management device comprising:
a storage device including a memory that stores information that defines a table having a plurality of control levels for each control target equipment of a plurality of control target equipment, each of the plurality of control levels defining a power saving effect corresponding to a control instruction to be applied to a control target equipment to regulate power consumption of the control target equipment, the control instruction executed by each of the ECUs in order to realize a control target function, a vehicular device to be controlled by each of the ECUs being defined as the control target equipment, and a function provided by at least one of each of the ECUs and each of the control target equipment being defined as the control target function; and
a control unit having a microcomputer, the control unit configured to
start an information acquisition process acquiring remaining amount information indicative of a remaining amount of the energy, and environmental information indicative of a travel environment of the vehicle,
set a level setting process that sets a target value for suppressing a power consumption of a whole of the vehicle based on at least the acquired remaining amount information indicative of the remaining amount of the energy by referring to the table stored in the storage device according to the target value and the acquired environmental information indicative of the travel environment and setting a control level for each of the control target equipment according to the acquired environmental information in order to reach the target value for the whole of the vehicle,
control each of the ECUs to execute a control for a respective control target equipment according to the control content indicated by the control level individually set by the level setting process,
set one of a plurality of situations according to the acquired environmental information, and
automatically set one of the control levels for each of the control target equipment without operation by a user of the vehicle according to the one of the plurality of situations,
wherein the environmental information includes a type of a road on which the vehicle is travelling or is to be traveling, a type of a position of the vehicle, weather information, and congestion information.

2. The vehicle energy management device according to claim 1, further comprising the control unit being configured to perform:
a distance calculation process calculating a driving range of the vehicle based on at least the remaining amount information indicative of the remaining amount of the energy in the information acquired by the information acquisition process, wherein:
the level setting process resets the control level, in order to increase a suppression degree of the power consumption of the whole of the vehicle, based on a target travel distance to a destination of the vehicle, which is set by a navigation device as one of the electronic control units (ECUs), and the driving range calculated by the distance calculation process, when the target travel distance exceeds the driving range.

3. The vehicle energy management device according to claim 2, wherein:
the level setting process cancels to reset the control level based on the target travel distance and the driving range when the destination is not input.

4. The vehicle energy management device according to claim 1, further comprising the control unit being configured to perform:
a distance calculation process calculating a driving range of the vehicle based on at least the remaining amount information indicative of the remaining amount of the energy in the information acquired by the information acquisition process, wherein:
the level setting process maintains the control level based on a target travel distance to a destination of the vehicle, which is set by a navigation device as one of the electronic control units (ECUs), and the driving range calculated by the distance calculation process, when the target travel distance is equal to or shorter than the driving range, and a difference between the driving range and the target travel distance is lower than a predetermined margin value.

5. The vehicle energy management device according to claim 1, further comprising the control unit being configured to perform:
a distance calculation process calculating a driving range of the vehicle based on at least the remaining amount information indicative of the remaining amount of the energy in the information acquired by the information acquisition process, wherein:
the level setting process resets the control level in order to reduce a suppression degree of the power consumption of the whole of the vehicle based on a target travel distance to a destination of the vehicle, which is set by a navigation device as one of the electronic control units (ECUs), and the driving range calculated by the distance calculation process, when the target travel distance is equal to or shorter than the driving range, and a difference between the driving range and the target travel distance is equal to or larger than a predetermined margin value.

6. The vehicle energy management device according to claim 1, wherein:
one of the electronic control units (ECUs) is a display control device that controls a plurality of display devices having different power consumptions from each other as the control target equipment; and
the control level related to the display control device is defined to stepwisely increase and decrease the power consumption of a whole of the plurality of display devices.

7. The vehicle energy management device according to claim 6, wherein:
at least one of the control levels related to the display control device provides to turn off one of the display devices having a relatively large power consumption, and to display information to be displayed on the one of the display devices, which is turned off, on another one of the display devices having a relatively small power consumption.

8. The vehicle energy management device according to claim 1, wherein:
one of the electronic control units (ECUs) is a radar control device that controls a radar device as one of the control target equipment; and
at least one of the control levels related to the radar control device provides to reduce at least one of an output of the radar device and a transmission cycle of a radar wave.

9. The vehicle energy management device according to claim 1, wherein:
a type of travel road includes one of a road congestion information, a road surface condition, and a road height.

10. The vehicle energy management device according to claim 1, wherein:
the type of position of the vehicle includes a current position of the vehicle as determined based on a positioning signal from one of a global positioning system (GPS), a distance sensor, and a gyroscope.

11. The vehicle energy management device according to claim 1, wherein:
the type of position of the vehicle includes an operation position of one of a direction indicator and a shift lever of the vehicle.

12. The vehicle energy management device according to claim 1, wherein:
in the table, as a control level is lower, a power consumption of the control target equipment becomes larger; and as the control level is higher, the power consumption of the control target equipment becomes smaller.

13. The vehicle energy management device according to claim 1, wherein:
as a control level is higher, the power saving effect becomes higher.

14. The vehicle energy management device according to claim 1, wherein
the plurality of control target equipment includes at least one of a display device, a vehicle acoustic equipment, a video equipment, a radar device, an air conditioner, and a motor, and
each control level is defined to increase and decrease the power consumption of each of the control target equipment in a stepwise manner.

* * * * *